United States Patent
Gosch

(10) Patent No.: US 7,144,561 B2
(45) Date of Patent: Dec. 5, 2006

(54) METHOD FOR THE PREPARATION OF IRON HYDROXIDE, IRON OXIDE HYDRATE OR IRON OXIDE FROM FILTER SALTS OF DILUTE ACID RECOVERY

(75) Inventor: Bodo Gosch, Herten (DE)

(73) Assignee: Sachtleben Chemie GmbH, Duisburg (DE)

( * ) Notice: Subject to any disclaimer, the term of this patent is extended or adjusted under 35 U.S.C. 154(b) by 390 days.

(21) Appl. No.: 10/745,693

(22) Filed: Jul. 8, 2003

(65) Prior Publication Data

US 2005/0019250 A1    Jan. 27, 2005

(30) Foreign Application Priority Data

Jul. 16, 2002    (DE)    ................. 102 32 069

(51) Int. Cl.
*C01G 1/00*    (2006.01)
*C01G 49/00*    (2006.01)

(52) U.S. Cl. ............... 423/138; 423/140; 423/142; 423/150.3; 423/632; 423/633; 423/DIG. 1; 423/DIG. 2

(58) Field of Classification Search ............... 423/138, 423/140, 142, 632, 633, DIG. 2, DIG. 1, 423/150.3
See application file for complete search history.

(56) References Cited

U.S. PATENT DOCUMENTS

| | | | | |
|---|---|---|---|---|
| 3,619,137 A | * | 11/1971 | Ratcliffe | 423/633 |
| 3,816,593 A | * | 6/1974 | Johnson et al. | 423/190 |
| 3,927,173 A | * | 12/1975 | Melzer | 423/142 |
| 4,119,536 A | * | 10/1978 | Iwase et al. | 210/722 |
| 4,889,697 A | * | 12/1989 | Fukushima et al. | 423/140 |
| 5,785,862 A | * | 7/1998 | Graham et al. | 210/723 |
| 6,139,753 A | * | 10/2000 | Taylor | 210/717 |

\* cited by examiner

*Primary Examiner*—Timothy C. Vanoy
(74) *Attorney, Agent, or Firm*—Fulbright & Jaworski L.L.P.

(57) ABSTRACT

Described is a method for the manufacture of iron hydroxide, iron oxide hydrate or iron oxide from filter salts from thin acid recovery, in which the filter salts are dissolved in water, the solution is adjusted to a pH of <1, then a pH of 2 to 4 is established by the addition of a strong base, with stirring, the substances precipitating are separated in a known manner, the remanent solution is adjusted to a pH of 6 to 8 by the addition of a strong base, the precipitating iron hydroxide is separated from the solution, washed, dried, and, if desired, dried and/or calcined to form iron oxide.

6 Claims, No Drawings

METHOD FOR THE PREPARATION OF IRON HYDROXIDE, IRON OXIDE HYDRATE OR IRON OXIDE FROM FILTER SALTS OF DILUTE ACID RECOVERY

FIELD OF THE INVENTION

The invention relates to a method for the preparation of iron hydroxide, iron oxyhydrate or iron oxide from filter salts of dilute acid recovery.

BACKGROUND OF THE INVENTION

In the production of titanium dioxide by the sulfate process, so-called dilute acid occurs. Dilute acid consists essentially of dilute sulfuric acid which contains the dissolved salts (mainly iron salts). In the industrial recovery of the dilute acid, the latter is concentrated and filter salts, or green salts, are produced, which are separated. The filter salts are thus produced in large amounts and, on account of their accompanying components they cannot easily be used industrially, but have to be disposed of, often at great expense.

The invention is addressed to the problem of overcoming the disadvantages of the state of the art and especially to create a process whereby iron hydroxide or iron oxide with a content of >90 wt.-% of $Fe_2O_3$ can be recovered from the filter salts of dilute acid recovery.

SUMMARY OF THE INVENTION

The problem is solved by a method for the preparation of iron oxide, iron oxide hydrate or iron oxide for filter salts of dilute acid recovery wherein the filter salts are dissolved in water, the solution is adjusted to a pH of <1, preferably <0.5, then by adding a strong base with stirring a pH of 2 to 4, preferably 3 to 3.8, the substances then precipitating are separated in a known manner, the remaining solution is adjusted with the addition of a strong base and/or an oxidizing agent to a pH of 6 to 8, the precipitating iron hydroxide or iron oxide hydrate is separated from the solution, washed, dried and if necessary dried and/or calcined to iron oxide.

DETAILED DESCRIPTION

Iron oxide, iron oxide hydrate or iron oxide are recovered from filter salts of dilute acid recovery. The filter salts are dissolved in water to form a solution of the filter salts in water. The pH of the solution is adjusted to a pH of less than 1, preferably less than 0.5. A strong base is then added to raise the pH to from 2 to 4, preferably from 3 to 3.8, causing precipitation of solids from the solution and filtered to remove them from the solution. The pH of the remaining solution was then adjusted with a strong base and/or an oxidizing agent. e.g., hydrogen peroxide. The change in pH precipitates iron hydroxide or iron oxide hydrate from the solution, and these precipitates are separated from the solution, washed and dried. If desired, the precipitates may be dried and/or calcined to form iron oxide.

Depending on how much dilute acid adheres to the filter salt, the filter salt solution already has a pH of <1 and then does not have to be adjusted separately. Otherwise, sulfuric acid or dilute acid is used for the adjustment of the pH. The filter salt solution contains preferably 200 to 350 g of solid matter per kg of solution.

An alkali metal hydroxide solution is used preferably as the strong base; caustic soda solution or caustic potash solution is especially preferred. The substances precipitating at a pH of 2 to 4 contain mainly metatitanic acid. Preferably, this is fed back into the titanium dioxide process.

Air, oxygen or hydrogen peroxide ($H_2O_2$) is used preferably as oxidant. When air or oxygen are used they are blown into the solution.

The calcining or drying temperature amounts preferably to 200 to 1300° C., especially preferably 300 to 1300° C., and quite especially preferably 600 to 1200° C. The calcining or drying can also be performed under vacuum.

The advantage of the method of the invention is that high-quality iron hydroxide or iron oxide hydrate and, after calcining, iron oxide with a content of >90 wt-% $Fe_2O_3$ is obtained. To lower the content of the sulfur contained as impurity in the iron oxide, the washing of the precipitated iron hydroxide is preferably repeated until the electrical conductivity in the washing filtrate is under 200 $\mu S/cm^{-1}$ especially preferably under 150 $\mu S/cm^{-1}$ In this manner an iron oxide is obtained after calcining, with a content of 94 wt-% $Fe_2O_3$.

The invention is further explained below with the aid of an example.

EXAMPLE 1

By dissolving 5 kg of filter salts from dilute acid recovery in 10 liters of water, an aqueous filter salt solution was prepared. This solution had a pH of 0. This means that sufficient acid was adhering to the filter salts, so that a separate addition of acid was unnecessary. The temperature of the solution was about 23° C. The solution was adjusted by stirring with about 150 ml of 50% caustic soda solution to a pH of 3.5, the temperature of the solution increasing to 55° C. After a 2-hour maturation phase at about 40° C. the precipitated solids were separated from the filtrate with a suction filter. The filtrate cooled during the solid-liquid separation to about 25° C. The filter solution was then again adjusted with 180 ml of 50% NaOH, with turbulent stirring during which atmospheric oxygen went into the solution, to a pH of 7.8, when much iron hydroxide precipitated. This was separated from the solution with a suction filter and washed with about 30 liters of water which had a temperature of 60° C. 3.5 kg of moist iron hydroxide was obtained. Then the iron hydroxide was dried in the dryer for 12 hours and then calcined for 2 hours at 600° C. in a laboratory oven in atmospheric air. The iron oxide obtained had a content of 94.5% $Fe_2O_3$.

The invention claimed is:

1. A method comprising dissolving filter salts in water, adjusting the solution to a pH of <1; adjusting that solution to a pH of 2 to 4 by adding a strong base while stirring to precipitate substances, separating the precipitates; adjusting the remnant solution to a pH of 6 to 8 by adding at least one of a strong base, or an oxidizing agent to precipitate iron hydroxide or iron oxide hydrate;

separating the precipitated iron hydroxide or iron oxide hydrate from the solution, washing the precipitated iron hydroxide or iron oxide and drying the precipitate.

2. The method according to claim 1, wherein sulfuric acid is added to adjust the pH to less than 1.0.

3. A method according to claim 1 wherein said strong base is an alkali metal hydroxide solution.

4. A method according to claim 1, wherein said oxidizing agent is selected from the group consisting of oxygen and $H_2O_2$.

5. The method of claim 1, further comprising calcining the dried precipitate.

6. The method of claim 5, wherein the calcining or drying temperature is 200 to 1300° C.

* * * * *